Figure 1:
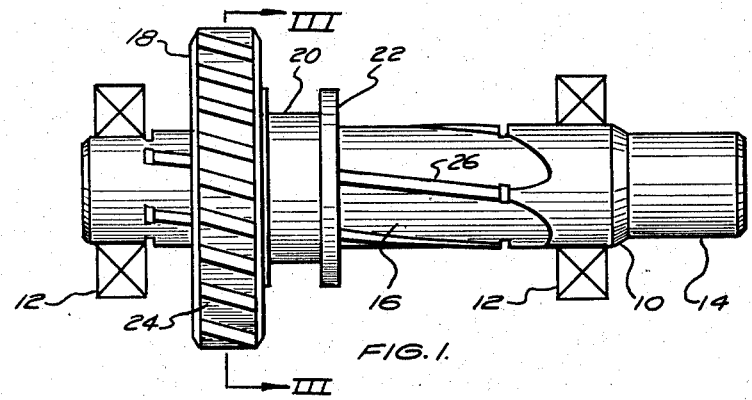

Sept. 22, 1959     R. W. WAGNER     2,905,006

POWER TAKE OFF

Filed Oct. 25, 1957

INVENTOR
ROBERT W. WAGNER

BY Beaman + Beaman

ATTORNEY

# United States Patent Office 2,905,006
Patented Sept. 22, 1959

2,905,006

POWER TAKE OFF

Robert W. Wagner, Chelsea, Mich., assignor to Dana Corporation, Toledo, Ohio, a corporation of Virginia Application October 25, 1957, Serial No. 692,404

3 Claims. (Cl. 74—401)

The invention relates to a torque lock for a sliding helical gear mounted in a splined shaft and particularly relates to the control of undesirable aerial gear translation due to heavy load conditions.

In torque transmitting units wherein engagement between two gears is accomplished by axially sliding one of the gears on a splined or keyed shaft, vibrations and unbalanced forces imposed on the slidable gear often cause axial movement of the gear along the splined shaft resulting in improper gear engagement and may result in complete disengagement of the two gears. The above problem becomes especially serious with helical gears wherein the angle of the gear teeth produce axial force vectors which react on the gear causing axial gear displacement along the shaft. Normally, when using a sliding helical gear on a splined shaft the spline is also formed in a helical fashion about the shaft, the lead of the spline being such to oppose and cancel out the axial thrust caused by the lead of the gear teeth. However, under heavy torque loads the gear may begin to "creep" axially with such force that the shifting yoke positioning the gear upon the shaft will bend.

Several theories concerning the cause of axial helical gear "creep" under heavy torque loads have been advanced, one theory holding that the heavy torsional forces on the splined shaft cause the shaft to "twist" sufficiently to change the lead of the helical spline rendering the spline ineffective to counteract the axial forces acting on the gear. However, in a series of tests conducted by me on gears and splines under heavy loads, the cause of "creep" does not appear to primarily be due to deformation of the shaft but rather to the unequal distribution of forces acting on the spline by the gear.

Inasmuch as the gear is slidably fitted upon the splined shaft, the clearance between the gear and shaft must be such to permit manual operation in small gearing units such as power take offs and the like under heavy torque loads the clearance between the gear and splined shaft will allow the axis of the gear to shift radially with respect to the axis of the shaft in the direction of the largest force exerted on the gear normal to the shaft. Also, as the torque forces are transmitted between the shaft and gear the clearance between the spline on the shaft and mating splined bore in the gear will result in only one side of the spline teeth of the shaft being in firm force transmitting contact with only one side of the teeth of the splined bore. Thus, a constant force perpendicular to the shaft will be counteracted only through the sides of the spline teeth of gear and shaft which are in engagement which results in a greater force acting on one half of the shaft spline teeth than on the other half, and as the gear and shaft rotate the force acting on a given spline tooth will vary between the maximum and minimum valves. It is this alternating fluctuation of forces acting on the gear which cause unequal forces on the gear and result in a gradual axial displacement of the gear along the shaft.

The problem of "creeping" may be successfully solved by increasing the friction between gear and spline to the point where the force required to move the gear along the shaft is greater than the force causing the gear to "creep," however, the friction between gear and shaft must also permit the gear to slide axially on the shaft when desired. Thus, it is an object of the invention to provide a connection between a splined shaft and an axially slidable gear which will easily permit translation of the gear when desired, yet will lock the gear and shaft together upon relative torque transmission.

Another object of the invention is to provide a spline construction which will lock to the mating member under torque application in such a manner to minimize relative radial displacement between the splined and mating members.

Yet another object of the invention is to provide a splined connection which may be accurately manufactured and automatically locks with the mating member to a degree proportionate to the torque being transmitted by the spline.

Figure 2:
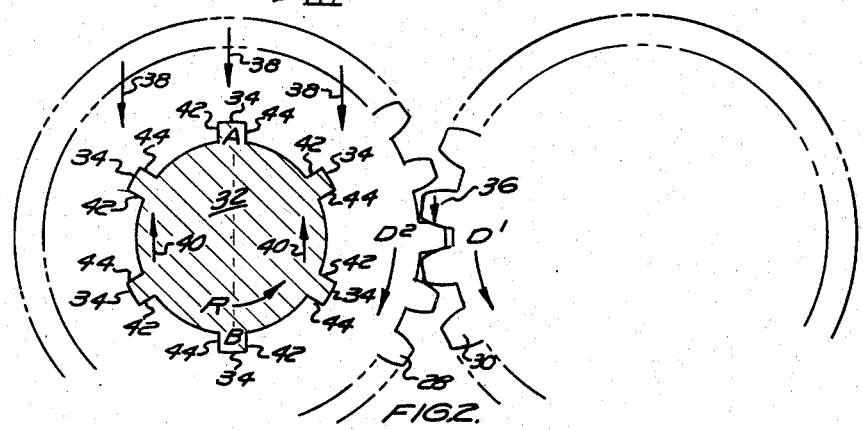
Figure 3:
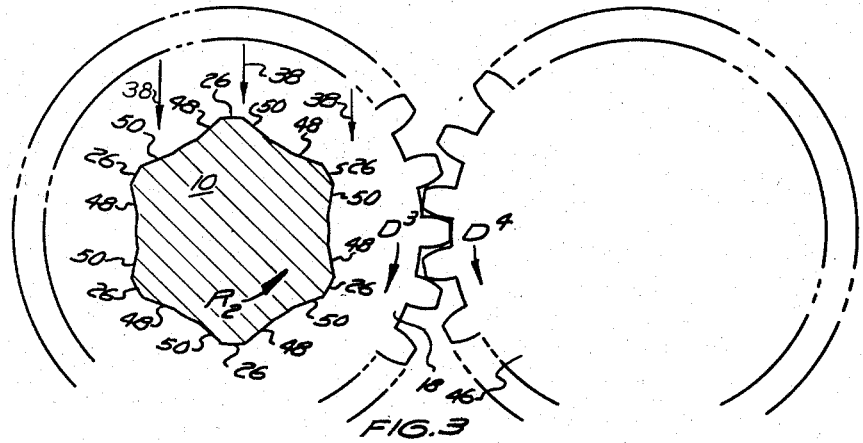
Figure 4:
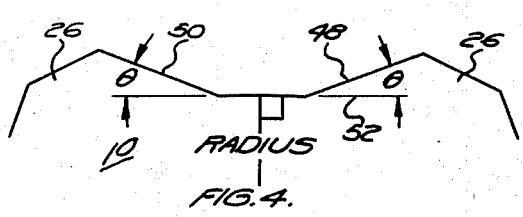

These and other objects of the invention will become apparent when viewed with regard to the following description and accompanying drawings wherein:

Fig. 1 is an elevational view of a typical installation employing the invention, Fig. 2 is a cross section of a conventional splined shaft and gear mounted thereon, Fig. 3 is a cross section taken along the line III—III of Fig. 1, and Fig. 4 is an enlarged cross section of a portion of the splined shaft shown in Fig. 3.

A typical arrangement of a splined shaft and gear utilizing the invention is shown in Fig. 1 wherein it will be observed that a shaft 10 is rotatably journaled in bearings 12 and is provided with a keyed end 14 for connection to driven means. The shaft 10 is splined at 16 intermediate the bearings on which the gear 18 is slidably mounted. The gear 18 is formed with a splined bore adapted to closely mate with the spline 18 of the shaft 10 and axial movement of the gear 18 is obtained by operation of a shiftable yoke (not shown) cooperating with the annular groove 20 formed in the hub 22 of the gear 18. Thus, by shifting the gear 18 along the spline 16 engagement may be made with a drive gear (not shown) which will rotatively drive the shaft 10.

In the interest of smooth, quiet, high speed operation, the teeth 24 of gear 18 are of the helical type which, as is well known, will create an axial force on the gear 18 during engagement with the drive gear. To counteract the axial force the teeth 26 of the spline 16 are also cut in helical fashion in the same direction as the gear teeth, however, although the lead of the gear teeth 24 and lead of spline teeth 26 are the same, the helix angle of the gear teeth is greater than the helix angle of the spline teeth since the gear teeth are a greater distance from the axis of rotation, i.e. the axis of shaft 10. Obviously the bearings 12 must be able to absorb any resulting axial thrust on shaft 10.

To more fully understand the forces exerted on a splined shaft, reference is made to Fig. 2 wherein a conventional splined shaft and slidable gear are shown. The gear 28 is driven by the gear 30, both gears being provided with helical teeth. The shaft 32 is provided with conventional shaped teeth 34 which are formed in helical fashion spiraling around the shaft. Assuming the gear 30 to be driven in the direction $D^1$, the gear 28 will rotate in direction $D^2$. If the shaft 32 is connected to torque resisting means, a winch or pump, for example, the resistance to rotation or reaction will be in the direction R although, of course, the direction of shaft rotation will be the same as gear 28.

As the gear 30 rotates, overcoming the reaction R, the direction of force exerted on gear 28 will be in the direction of arrow 36 which results in a downward force throughout gear 28 as represented by the arrows 38. The force 38 is counteracted by equal and opposite forces 40 exerted on the gear 28 by shaft 32 originating at the bearings supporting shaft 32.

Theoretically the forces 40 will react on the gear 28 throughout the horizontal width of the shaft 32, thus the forces 40 acting on the gear 28 to the left of vertical diameter AB will be equal to the forces 40 on the right. However, due to the perpendicular force 38 and the clearances between the splined shafts 32 and mating bore in the gear 28 necessary to permit sliding of the gear on the shaft and also resulting from manufacturing limitations, the actual force distribution is not evenly divided on each side of the diameter AB. With the reaction R in the direction indicated, the sides 42 of spline teeth 34 will be in tight driving engagement with the gear 28 and the sides 44, due to slight clearance, will only be touching the adjacent portion of gear 28 and will not be in torque or force transmitting relation with the gear. Thus, it will be understood that the force 40 must be transmitted through either the upper half of shaft 32 in contact with gear 28 or the side 42 of the spline teeth 34 as the teeth pass through the 180° arc to the right of line AB, where the teeth 34 are moving in the same direction as the force 38. Therefore, as the teeth 34 move in the direction of force 38 the force acting on sides 42 will equal the torque forces plus the force component due to the force 38. As the teeth 34 rotate to the left of line AB the force on side 42 will be equal to the torque force minus the component of force 38. Thus, it will be apparent that the total forces exerted on spline teeth 34 will vary in accordance with the tooth relation to the direction of the force 38, reaching a maximum when the tooth 34 projects at right angles to the force 38 on the right side of line AB and achieves a minimum value when extending at right angles to force 38 on the left of line AB as viewed in Fig. 2.

The greater force 38 acting on the teeth to the right of line AB produces an axial force component on the gear which is not counteracted on the left side of line AB, therefore, although the proper helix angle of spline teeth 34 is sufficient to counteract axial movement of the gear 28 due to the constant pressure exerted on the gear 28 by the teeth of gear 30, the fluctuating force 38 acting on a given spline tooth 34 as the shaft 32 rotates causes the gear 28 to a slowly "creep" along the spline. Attempts to eliminate "creep" by increasing the helix angle of the spline teeth have not proven satisfactory in that low torque characteristics are erratic and axial shifting of the slidable gear becomes difficult.

The above objectionable axial translation, referred to as "creep," may be largely overcome by the employment of a spline of the configuration shown in Figs. 1 and 3. Basically the spline of the invention permits the slidable gear to "lock" to the splined shaft under relative torque transmission between gear and shaft, the locking action being performed by the spline surfaces which minimize relative radial deflection between gear and shaft, and increase the frictional contact therebetween.

As seen in Fig. 3, the gear 18 may be driven in either direction of rotation by a meshing drive gear 46, the teeth of each gear being of the helical type. The spline 16 consists of a plurality of circumferentially spaced teeth 26 formed helically about shaft 10 to counteract the axial forces resulting from the helix angle of the teeth of gear 18. The spline teeth 26 are formed with sides 48 and 50 which lie at an angle $\theta$ (Fig. 4) to the tangent line 52 perpendicular to the radius of shaft 10 bisecting the valley between adjacent teeth 26. The angle $\theta$ is such that under heavy torque loads a locking action with the gear 18 is created which will prevent the gear 18 from creeping.

When the gears 18 and 46 are rotating in directions $D^3$ and $D^4$, for instance, and the resistance to rotation of shaft 10 is in the direction $R_2$ the torque transmitted from gears 18 to shaft 10 will be through contact of the gear with the sides 48 of the spline teeth 26 for reasons set forth in the above explanation of Fig. 2. The advantages of the spline of the invention derive from the angular relationship of the side of the spline tooth to the gear 18 whereby the torque applied to gear 18 will tend to cause the mating surfaces of the gear to "ride up" the spline side 48. Obviously, this attempt of the gear 18 to move up the side 48 will result in an attempted radial displacement of the gear which is resisted by the engaging sides 48 on the opposite half of the spline. Thus, since the gear 18 is an integral member, the increasing of torque transmission between gear 18 and shaft 10 will increase the tendency for the gear to center itself on the shaft 10, eliminating any clearances between gear and spline and aids in equalizing the forces imposed on the spline teeth 26. The engagement of gears 18 and 46 will produce a force 38, as described above, normal to the axis of shaft 10 producing an additional force on the spline teeth on the right half of shaft 10 as viewed in Fig. 3. However, as the force acting on the sides 48 on the right half of shaft 10 increases, the angle of side 48 will create a radial force vector which is counteracted by a radial force acting on the sides 48 of spline teeth 26 on the left side of the shaft. Thus, the force 38 tends to be distributed to all of the spline teeth simultaneously increasing the unit pressure on each tooth which will increase the friction between gear 18 and shaft 10 thereby increasing the resistance of axial movement of the gear. Further resistance to "creeping" of gear 18 is due to the fact that the distribution of force 38 to each of the spline teeth 26 substantially eliminates the fluctuation of force acting on a given spline tooth during each rotation of shaft 10.

Thus, the increase in unit pressure, the equalizing distribution of torque and perpendicular forces on the spline teeth and the tendency of the slidable gear to center itself on the splined shaft increase the sliding resistance of the gear under load and effectively prevent the gear from "creeping." As the torque load increases the gear 18 will be increasingly "locked" to the shaft 10 and axial creep prevented at all torque values imposed on the gear.

The angle $\theta$ of the sides 48 and 50 is not a "locking angle" in the sense of a wedge angle, but rather is an angle which under the contemplated loads will produce a locking action. Thus, preferably the angle $\theta$ is such that the tangent of $\theta$ will be approximately equal to the coefficient of friction between the slidable gear and shaft. Thus, when gear 18 and shaft 10 are both of steel for which the static dry coefficient of friction is about .15 the preferred magnitude of $\theta$ will be approximately 8½°. Contrast may be made with the sides 42 and 44, Fig. 2, of a conventional spline tooth which extend in a substantially radial direction. The better ability of the spline teeth of the invention, over the conventional design, to prevent radial deflection of the gear is readily apparent in that the plane of the tooth side is almost perpendicular to the radial forces within the gear rather than parallel to radial forces as in the conventional design.

It will be understood that the above references to the direction of forces acting on the left and right half of the shafts 10 and 32 apply only when the gears 18 and 28 are rotating in the indicated direction, upon reversal of the direction of rotation and reaction on the splined shaft the forces acting on the spline will be reversed and the opposite side of the spline teeth will engage the gear.

I claim:

1. In a splined connection, a rotatable shaft, spline teeth formed in helical fashion about an axial portion of said shaft having torque transmitting sides defined thereon, a helical gear coaxially mounted on said shaft in axially slidable relation thereto, said gear being internally splined for complementary engagement with the spline teeth of the shaft, the helical angle of the gear teeth and said spline teeth being similarly disposed with respect to the shaft axis, a valley defined between adjacent spline teeth, the sides of said spline teeth adjacent said valley being disposed with respect to said shaft whereby an acute angle of less than 45° is defined by each of said sides and a line normal to a radius of said shaft passing through the midpoint of said valley whereby torque forces transferred between said gear and shaft through said spline teeth primarily tend to deflect said gear radially.

2. In a splined connection, a rotatable shaft, helical spline teeth formed on said shaft, a helical gear coaxially mounted on said shaft for axial movement thereto, a splined bore within said gear complementarily shaped to cooperate with said spline teeth, the helical angle of the gear teeth and said spline teeth extending in substantially the same direction with respect to the axis of said shaft, a valley defined between adjacent spline teeth, the sides of spline teeth adjacent said valley being disposed on said shaft whereby an acute angle is defined by each of said sides and a line normal to a radius of said shaft passing through the midpoint of said valley whereby the tangent value of said acute angle is approximately equal to the coefficient of friction between said shaft and said gear.

3. In a spline construction for use with an axially slidable helical gear splined to a rotatable shaft, helical spline teeth formed on said shaft, a bore within said gear having teeth complementary to said spline teeth, the helical angle of said spline teeth and the teeth of said gear extending in substantially the same direction with respect to the axis of said shaft, a valley defined between adjacent spline teeth, the sides of said spline teeth adjacent said valley being disposed with respect to said shaft whereby an acute angle is defined by each of said sides and a line normal to a radius of said shaft passing through the midpoint of said valley whereby the tangent value of said acute angle is approximately equal to the coefficient of friction between the shaft and gear.

References Cited in the file of this patent

UNITED STATES PATENTS

| | | |
|---|---|---|
| 935,328 | Russell | Sept. 28, 1909 |
| 2,205,473 | Fishburn | June 25, 1940 |